Patented Sept. 28, 1954

2,690,455

UNITED STATES PATENT OFFICE 2,690,455

ETHYLENE BIS-ARYLBIGUANIDES AND PROCESS OF PREPARING SAME

Donald W. Kaiser, Old Greenwich, and Dagfrid Holm-Hansen, Stamford, Conn., assignors to American Cyanamid Company, New York, N. Y., a corporation of Maine No Drawing. Application July 24, 1952, Serial No. 300,778

12 Claims. (Cl. 260—565)

The present invention relates to a new class of compounds, the ethylene bis-arylbiguanides of the formula

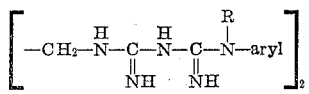

and their preparation. In this formula R is H or alkyl, and "aryl" means an aromatic radical of the benzene series, substituted or unsubstituted. The aromatic radical can carry substituents such as alkyl side chains, halogens, additional aromatic substituents, as well as alkoxy, sulfo, nitro, sulfonamido, hydroxy, and carboxy groups.

The new compounds are useful in the preparation of pharmaceuticals, dyes, synthetic resins, in hydrocarbon purification, as metal deactivators, as antioxidants in soap, and the like.

The new biguanides can be prepared by heating together ethylene bis-dicyandiamide, an aromatic amine, and a strong mineral acid, e. g., HCl, preferably in equivalent quantities, and further preferably dissolved in an inert solvent. This procedure gives the acid addition salt, from which the free biguanide can be obtained by neutralizing with an alkali, e. g., sodium hydroxide in dilute aqueous solution. For certain uses the salt and the free biguanide have been found to be equivalent.

Some hydrochloride acid addition salt is formed within a few minutes after heating is begun, and the reaction is generally complete within an hour, particularly under reflux conditions. In many cases the crude hydrochloride salt separates as crystals or as an oil when the reaction mass is cooled. In some cases, however, the hydrochloride is too soluble to crystallize when the reaction mass solution is cooled, and under these circumstances the product can conveniently be recovered as a less soluble salt, e. g., the nitrate, by adding an equivalent of nitrate ions (e. g., sodium nitrate) to the solution. When converting the biguanide to the nitrate it should of course be kept in mind that the biguanide is dibasic, necessitating two moles of nitrate ions per mole of biguanide dihydrochloride.

The proportions of reactants is not critical, and some of the desired product will be obtained within the dicyandiamide:amine:acid respective mole ratio of 1–10:1–10:1–10. Any excess reagent can be recovered for reuse in ways well known in the art. It is preferred, however, to use about 2–2.5 moles each of amine and acid per mole of the dicyandiamide reactant.

The reaction should be carried out in a solution that contains enough water to dissolve the addition product of the amine and acid. If this addition product is found to be difficultly soluble when the aqueous solution is heated, a further inert water-miscible solvent can be added. Such solvents are the alcohols, and in particular the glycol monoalkyl ethers (Cellosolves). In fact, a reaction menstruum consisting of a 25–75% solution of ethyl Cellosolve (glycol monoethyl ether) in water has been found to be generally applicable in conducting the reaction.

In conducting the reaction, a temperature of at least 50° C. should be used; preferably reflux conditions are employed.

The following examples illustrate without limiting the invention.

EXAMPLE 1

Ethylene bis(phenylbiguanide)

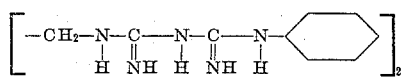

Ethylene bis dicyandiamide____ 0.10 mole, 19.4 g.
Aniline_____ 0.22 mole, 20.4 g.
HCl (conc.)_____ 0.22 mole, 22. g.
Water_____ 75 ml.
Ethyl Cellosolve_____ 25 ml.

The mixture was refluxed for one hour and then cooled to give 33 g. of hydrochloride addition salt which melted with decomposition at 215° C. The hydrochloride was converted to the free base, M. P. 170° C. (decomposition), in a 90% yield, by neutralization with 10% aqueous sodium hydroxide. The melting point of the base was unchanged after crystallization from a benzene-alcohol mixture.

EXAMPLE 2

Ethylene bis(1-tolylbiguanide)

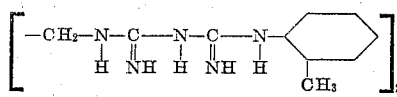

Ethylene bis dicyandiamide____ 0.1 mole, 19.4 g.
o-Toluidine_____ 0.22 mole, 23.6 g.
HCl (conc.)_____ 0.22 mole, 22. g.
Water_____ 75 ml.
Ethyl Cellosolve_____ 25 ml.

The above mixture was refluxed for one hour. On cooling the reaction mixture, the crude hydrochloride salt slowly crystallized. The mixture was filtered and the crude salt air-dried.

The 29 g. of product, M. P. 221° C. with decomposition, was crystallized from 110 ml. of water. A second crystallization from water gave a M. P. of 230°, with decomposition.

To prepare the free base, 10 grams (0.021 mole) of the hydrochloride was dissolved in 50 ml. of hot water. The solution was treated with activated charcoal and filtered. The filtrate was slowly added to a cold solution of 2.5 g. of sodium hydroxide in 25 ml. of water. The free base separated as an oil but upon cooling immediately solidified. The mixture was filtered, the solid washed with water, and air-dried. Crystallization from alcohol gave a solid which melted at 156–7° C.

EXAMPLE 3

*Ethylene bis(p-tolylbiguanide)*

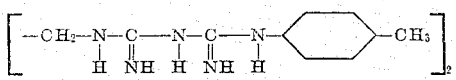

| | |
|---|---|
| Ethylene bis dicyandiamide | 0.1 mole, 19.4 g. |
| p-Toluidine | 0.2 mole, 21.4 g. |
| HCl (conc.) | 0.2 mole, 20. g. |
| Ethyl Cellosolve | 50 ml. |
| Water | 50 ml. |

Refluxing for 75 minutes and then cooling gave 35 g. of solid, M. P. 237° C. An 85% recovery of the hydrochride (M. P. 241° C., decomposition) was obtained after crystallization from a 10% aqueous solution.

To prepare the free base, a solution of 14.5 g. of the hydrochloride in 150 ml. of 16% aq. alcohol was treated with charcoal and filtered. The hot filtrate was added slowly to a cold solution of 3.5 g. of sodium hydroxide in 30 ml. of water. The product was first in the form of an oil which solidified on cooling. The water was decanted and the solid washed with water. Crystallization from 50 ml. of alcohol gave 10 grams of free base which melted with decomposition at 165° C.

EXAMPLE 4

*Ethylene bis(p-tert-amylphenylbiguanide)*

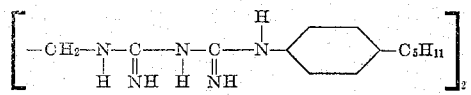

| | |
|---|---|
| Ethylene bis dicyandiamide | 0.2 mole, 38.8 g. |
| p-Tert-amylaniline | 0.4 mole, 65.3 g. |
| HCl (conc.) | 0.4 mole, 40. g. |
| Water | 200 ml. |

The above mixture was refluxed for 80 minutes. The hydrochloride salt, a viscous, white oil, separated from the solution on cooling.

Since the hydrochloride did not solidify, the product was converted to the nitrate by the addition of the excess of dilute aqueous sodium nitrate. The nitrate was obtained in the form of a tacky solid which did not solidify on standing. About 75 ml. of alcohol was added to the reaction mixture to dissolve unreacted amyl aniline, and, after stirring and cooling, a product which could be filtered was obtained. The crude nitrate, after air-drying, weighed 128 g. Crystallization from 950 ml. of 50% aqueous alcohol gave 66 g. of white crystalline solid, M. P. 182–4° C.

The free base was obtained by adding a solution of the nitrate in aqueous alcohol to excess, cold, dilute sodium hydroxide. The resulting gummy solid was dried in a vacuum desiccator after the liquid portion had been decanted. When dry, the crude base, a brittle, glass-like product, softened at 98° and melted at 110° C. The crude material was recrystallized from a solution of 100 ml. of methanol and 50 ml. of ethanol. The purified free base was obtained as a white crystalline solid which melted at 170–2°.

EXAMPLE 5

*Ethylene bis(nonylphenylbiguanide)*

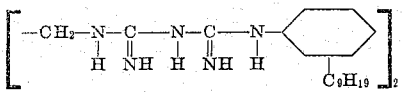

| | |
|---|---|
| Nonyl aniline | 0.2 mole, 43.8 g. |
| HCl (conc.) | 0.2 mole, 20. g. |
| Ethylene bis-dicyandiamide | 0.1 mole, 19.4 g. |
| Water | 125 ml. |
| Ethyl Cellosolve | 20 ml. |

The above reagents were reacted in substantially the same manner as in the preceding example. On cooling the reaction solution, a gelatinous mixture containing the biguanide hydrochloride was obtained which did not crystallize on standing. Addition of an aqueous solution of 0.3 mole of sodium nitrate gave the nitrate salt as a gummy solid.

To obtain the free base, the water was decanted and 100 ml. of alcohol added to the residue. The resulting alcoholic solution of the nitrate addition salt was added to an excess of cold, dilute sodium hydroxide. The free base produced was extracted with benzene and the benzene solution washed with water and dried over calcium sulfate. The mixture was filtered, and the filtrate distilled under reduced pressure until most of the benzene was removed. After drying the residue in a vacuum desiccator, the free base remained as a dark brown, waxy oil.

EXAMPLE 6

*Ethylene bis(2,4-dimethylphenylbiguanide)*

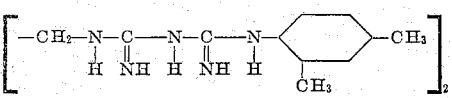

| | |
|---|---|
| 4-amino-1,3-dimethylbenzene | 0.2 mole, 24.2 g. |
| HCl (conc.) | 0.2 mole, 20 g. |
| Ethylene bis-dicyandiamide | 0.1 mole, 19.4 g. |
| Water | 100 ml. |

A 60% yield of the hydrochloride, M. P. 236°, was obtained from the above mixture after refluxing for one hour.

The hydrochloride was converted to the free base in the usual manner. After drying in a vacuum desiccator, the crude base was obtained in the form of a brittle, glass-like material which was very soluble in benzene but insoluble in cyclohexane.

To purify the crude base it was dissolved in benzene. Since the solution contained a few drops of water, it was heated to co-distill the water and benzene. When the temperature reached 80.5° C., heating was discontinued and the mixture was filtered to remove a small amount of finely-divided solid. Cyclohexane was added to the filtrate until the solution became cloudy at reflux. On cooling, a finely-divided solid was obtained, M. P. 136° C.

EXAMPLE 7

*Ethylene bis(3,5-dimethylphenylbiguanide)*

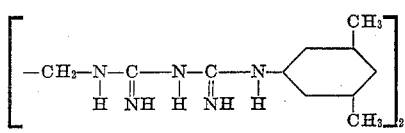

| 3,5-dimethylaniline | 0.2 mole, 24.2 g. |
| --- | --- |
| HCl (conc.) | 0.2 mole, 20. g. |
| Ethylene bis-dicyandiamide | 0.1 mole, 19.4 g. |
| Water | 100 ml. |

As the solution of the hydrochloride salt obtained by refluxing the above mixture did not crystallize after long standing at room temperature, an aqueous solution of sodium nitrate was added to the hydrochloride solution to convert the biguanide to the less soluble nitrate. There was obtained 41 g. of solid nitrate which melted at 102° C. Crystallization from 600 ml. of 20% aqueous ethyl Cellosolve gave 26.5 g. of crystalline nitrate salt, M. P. 166° C.

The free base was obtained by adding an aqueous solution of the nitrate to an excess of cold dilute alkali (10% sodium hydroxide). The crude base was purified by crystallization from benzene and then from acetonitrile. M. P. 163°, with decomp.

EXAMPLE 8

*Ethylene bis(o-diphenylbiguanide)*

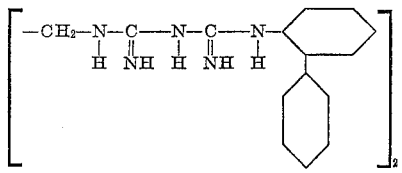

| o-Aminodiphenyl | 0.2 mole, 37.8 g. |
| --- | --- |
| Hcl (conc.) | 0.2 mole, 20. g. |
| Ethylene bis-dicyandiamide | 0.1 mole, 19.4 g. |
| Water | 200 ml. |

The reaction was carried out as in the preceding examples. Thirty-five grams of the hydrochloride, M. P. 236° C. was obtained.

To obtain the free base, 30 grams of the hydrochloride was dissolved in a hot solution of 700 ml. of 40% aqueous ethyl Cellosolve. The solution was treated with activated charcoal and then was added over a period of two hours to a cold solution of 8 g. of sodium hydroxide in 100 ml. of water. The water was decanted from the tacky product. After drying in a vacuum desiccator, the crude free base was obtained as a brittle solid weighing 27 g. To purify it, the product was dissolved in 150 ml. of warm benzene, and the solution was boiled until about 25 ml. of benzene had distilled, thereby removing a trace of water. The resulting cloudy solution was filtered and the filtrate diluted with 100 ml. of cyclohexane. The hot solution was allowed to cool slowly. A tacky solid separated. The solvent was evaporated at room temperature, first at atmospheric pressure and then in a vacuum desiccator. Twenty-four grams of the purified free base was obtained as a brittle solid which softened at 65° C.

EXAMPLE 9

*Ethylene bis(p-chlorophenylbiguanide)*

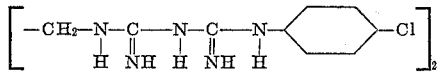

| Ethylene bis-dicyandiamide | 0.10 mole, 19.4 g. |
| --- | --- |
| p-Chloroaniline | 0.22 mole, 28.4 g. |
| HCl (conc.) | 0.22 mole, 22. g. |
| Ethyl Cellosolve | 25 ml. |
| Water | 75 ml. |

The chloroaniline, hydrochloric acid, and water, gave a black solution, which was decolorized with activated charcoal before proceeding further. Thereafter the dicyandiamide and Cellosolve were added and the mixture refluxed for one hour. Cooling the resulting solution gave 40 g. of hydrochloride salt, M. P. 236° C. (decomposition).

The hydrochloride was converted to the free base as in the preceding examples. After crystallizing from a mixture of benzene and alcohol, the thus purified product melted at 167°.

EXAMPLE 10

*Ethylene bis(2,5-diethoxyphenylbiguanide)*

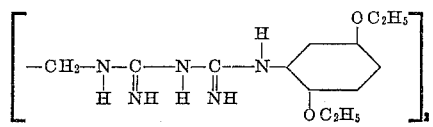

| Aminohydroquinone diethyl ether | 0.235 mole, 42.6 g. |
| --- | --- |
| HCl (conc.) | 0.2 mole, 20. g. |
| Ethylene bis-dicyandiamide | 0.1 mole, 19.4 g. |
| Water | 100 ml. |

A mixture of the amine, acid, and 75 ml. of water was heated to obtain complete solution. The dicyandiamide and 25 ml. of water were then added and the mixture refluxed for one hour. The solution was cooled and the crystalline solid hydrochloride salt that separated was filtered off. There was obtained 59 g., M. P. 190°. Recrystallization from 200 ml. of water gave 45 g. of solid, M. P. 192°, apparently contaminated with a little of the amine reactant. The recrystallized product was slurried in benzene to remove the amine, and the mixture then filtered. This procedure was repeated twice. Thirty-six grams of product, M. P. 206° C. was recovered.

To obtain the free base, a solution of 31.5 g. of the hydrochloride in 200 ml. of water was treated with activated charcoal and filter aid. The mixture was filtered and the filtrate added to a cold solution of 6.5 g. of sodium hydroxide in 100 ml. of water. The mixture was then filtered and the solid washed with water. The product became gummy during filtration, but after drying in a vacuum desiccator there was obtained 26 g. of solid crude base, M. P. 68–77° C. Nineteen grams of the crude base was recrystallized from 200 ml. of benzene, giving 14 g. of crystalline powder, M. P. 145–7° C.

EXAMPLE 11

*Ethylene bis(p-sulfophenylbiguanide)*

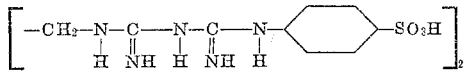

| Ethylene bis-dicyandiamide | 0.1 mole, 19.4 g. |
| --- | --- |
| Sulfanilic acid·H₂O | 0.2 mole, 38.2 g. |
| Water | 200 ml. |

After refluxing the above mixture for 10 minutes, complete solution was obtained. Heating was continued until the product separated, requiring about 50 minutes additional, after which the mixture was cooled and filtered. The product was dried at 70° C. There was obtained 45 g. of the desired biguanide as the dihydrate, a solid decomposing at 280° C. The yield of crude dihydrate was 79.5%.

The solid was suspended in 250 ml. of water. The addition of 40 ml. of 20% sodium hydroxide gave complete solution. After treating the alkaline solution with activated charcoal, the product was precipitated with 1 N hydrochloric acid. The mixture was filtered and the solid suspended in 350 ml. of water. The mixture was heated to 70° and filtered to remove unreacted sulfanilic acid. After drying in a steamheated oven, the purified biguanide was obtained in anhydrous form. It weighed 34 g. and decomposed at 225° C.

EXAMPLE 12

*Ethylene bis(N-butylphenylbiguanide)*

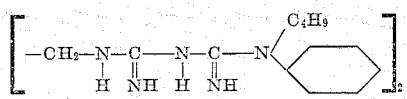

| | |
|---|---|
| Ethylene bis-dicyandiamide | 0.1 mole, 19.4 g. |
| N-butylaniline | 0.2 mole, 30. g. |
| HCl (conc.) | 0.2 mole, 20. g. |
| Water | 75 ml. |
| Ethyl Cellosolve | 25 ml. |

After refluxing the above mixture for one hour, it was cooled and allowed to stand for 24 hours, but the hydrochloride did not crystallize. An aqueous solution of 0.3 mole of sodium nitrate was therefore added to replace the hydrochloride by the less soluble nitrate. The product separated as an oil which solidified after decanting the aqueous layer and washing with water. The mixture was filtered and the solid air-dried. A yield of 36 g. (58%) of the nitrate, M. P. 265–7°, was obtained. Recrystallization of the product from 160 ml. of water gave 22 g. of solid, M. P. 186–8° C. Analysis indicated that the salt was probably at least partially hydrated.

The nitrate was converted to the free base (an oil) as in the preceding examples. To purify the base, the oil was extracted with benzene, the benzene solution dried over calcium sulfate, and the benzene then removed in a vacuum desiccator.

EXAMPLE 13

Ethylene bis-dicyandiamide,

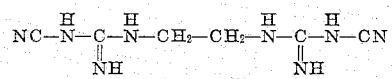

was prepared as follows:

| | Moles |
|---|---|
| Ethylenediamine | 1 |
| Sulfuric acid | 1 |
| Sodium dicyanamide (79%) | 2.2 |
| Butanol. | |

The sulfuric acid, diluted with 100 ml. of water, was added dropwise to the amine in 1.1 of butanol. The mixture was distilled under reduced pressure until water was removed. The dicyanamide and 750 ml. of butanol were added. A few ml. of H₂SO₄ were added to bring the pH of the mixture to about 7.5. The mixture was then heated on a steam bath for 18 hours.

Most of the butanol was distilled off under reduced pressure. Five hundred ml. of water was added and distillation continued. When most of the solvent was removed 1.1 of water was added, the mixture cooled and filtered. The solid was washed with water and air-dried to give 164 g. of product which decomposed at 240° C. Yield, 84.5%.

A number of variations are possible in conducting the process of the instant invention. Thus, other strong mineral acids can be used instead of hydrochloric acid, e. g., hydrobromic acid, sulfuric acid, nitric acid, phosphoric acid, and the like. Also, all or part of the acid may be used combined with the amine reactant as the acid addition salt. While it is preferred to use a solvent, some of the desired product is obtained by simply fusing the reactants.

While the invention has been described with particular reference to specific embodiments, it is to be understood that it is not to be limited thereto but is to be construed broadly and restricted solely by the scope of the appended claims.

We claim:

1. Ethylene bis-arylbiguanides of the group consisting of the ethylene bis-phenylbiguanides, the ethylene bis-alkylphenylbiguanides, the ethylene bis-sulfophenylbiguanides, the ethylene bis-lower alkoxyphenylbiguanides, the ethylene bis-halophenylbiguanides, and the ethylene bis-naphthylbiguanides within the formula

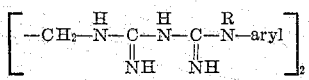

in which R is a member of the group consisting of hydrogen and lower alkyl radicals.

2. Ethylene bis(1-tolylbiguanide) of the formula

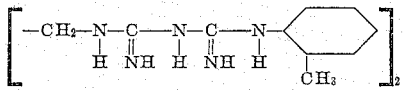

3. Ethylene bis(p-tolylbiguanide) of the formula

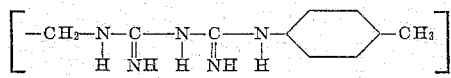

4. Ethylene bis(p-tert-amylphenylbiguanide) of the formula

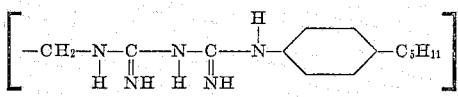

5. Ethylene bis(nonylphenylbiguanide) of the formula

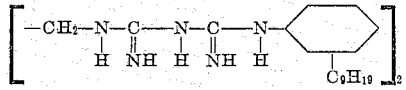

6. The method of preparing an ethylene bis-arylbiguanide of the formula

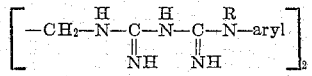

in which R is a member of the group consisting of hydrogen and lower alkyl radicals that comprises heating together in an aqueous solvent at a temperature of at least about 50° C. (I) ethylene bis-dicyandiamide, (II) an aromatic amine of the group consisting of the primary anilines and the N-lower alkyl anilines, and (III) a strong mineral acid.

7. The method according to claim 6 in which the acid is hydrochloric acid.

8. The method according to claim 7 in which the stoichiometric quantities of I, II, and III are respectively substantially 1:2:2.

9. The method of preparing ethylene bis(1-tolylbiguanide) according to the process of claim 6 that comprises heating together ethylene bis-dicyandiamide, o-toluidine, and hydrochloric acid.

10. The method of preparing ethylene bis(p-tolylbiguanide) according to the process of claim 6 that comprises heating together ethylene bis-dicyandiamide, p-toluidine, and hydrochloric acid.

11. The method of preparing ethylene bis(p-tert-amylphenylbiguanide according to the process of claim 6 that comprises heating together ethylene bis-dicyandiamide, p-tert-amylaniline, and hydrochloric acid.

12. The method of preparing ethylene bis(nonylphenylbiguanide) of the formula

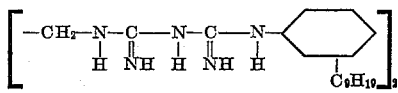

according to the process of claim 6 that comprises heating together ethylene bis-dicyandiamide, nonylaniline, and hydrochloric acid.

References Cited in the file of this patent

UNITED STATES PATENTS

| Number | Name | Date |
|---|---|---|
| 2,255,090 | Tinker et al. | Sept. 9, 1941 |
| 2,455,896 | Nagy | Dec. 7, 1948 |

FOREIGN PATENTS

| Number | Country | Date |
|---|---|---|
| 239,001 | Switzerland | Dec. 3, 1945 |
| 632,572 | Germany | July 16, 1936 |

OTHER REFERENCES

Slotta et al.: "Ber. deut. Chem.," vol. 62 (1929), p. 1404.